United States Patent

Holmes

(10) Patent No.: US 8,319,391 B2
(45) Date of Patent: Nov. 27, 2012

(54) FLUX-CONCENTRATING STATOR ASSEMBLY

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 375 days.

(21) Appl. No.: 12/794,901

(22) Filed: Jun. 7, 2010

(65) Prior Publication Data

US 2011/0298327 A1 Dec. 8, 2011

(51) Int. Cl.
*H02K 1/00* (2006.01)
(52) U.S. Cl. ............ 310/254.1; 310/179; 310/216.001
(58) Field of Classification Search .......... 310/164, 310/179, 193, 254.1, 257, 216.001, 216.002, 310/216.005, 216.006, 216.015, 216.073, 310/216.034, 216.074, 216.079, 216.111
See application file for complete search history.

(56) References Cited

U.S. PATENT DOCUMENTS

| | | | | |
|---|---|---|---|---|
| 2,017,624 A * | 10/1935 | Janzen | | 310/164 |
| 3,827,141 A * | 8/1974 | Hallerback | | 29/596 |
| 5,304,883 A * | 4/1994 | Denk | | 310/180 |
| 6,064,132 A * | 5/2000 | Nose | | 310/216.102 |
| 6,211,595 B1 * | 4/2001 | Nose | | 310/216.111 |
| 6,236,135 B1 * | 5/2001 | Suzuki et al. | | 310/192 |
| 6,344,703 B1 * | 2/2002 | Sawada et al. | | 310/90 |
| 7,145,280 B2 * | 12/2006 | Noble et al. | | 310/254.1 |
| 2008/0315700 A1 | 12/2008 | Ishikawa et al. | | |

* cited by examiner

*Primary Examiner* — Dang Le
(74) *Attorney, Agent, or Firm* — Quinn Law Group, PLLC

(57) ABSTRACT

A stator assembly for an electric motor includes an annular core centered about an axis of rotation of an inner rotor which the stator assembly surrounds. The stator assembly has a plurality of electrical windings, each wound in a respective spiral around the outer surface of the core and arranged for current to flow in the windings. In some embodiments, the respective spirals are spaced from and parallel with one another. The stator assembly may have pole pieces that substantially enclose the core and windings. The pole pieces may be configured to taper both radially outward and axially inward to thereby concentrate flux from the core to an inner surface of the pole pieces facing the rotor.

16 Claims, 3 Drawing Sheets

FLUX-CONCENTRATING STATOR ASSEMBLY

TECHNICAL FIELD

The invention relates to a stator assembly for an electric motor having a core with spirally-wound electrical windings.

BACKGROUND

Electric motor/generators are used for various purposes, such as in a hybrid electric vehicle to produce torque from stored electrical energy. The efficiency of an electric motor depends in part upon how well magnetic flux generated by electrical windings is captured and directed toward a rotor to turn the rotor. Stator assemblies with relatively complex electrical windings are commonly used. End turns of the windings often extend axially from the stator assembly. Relatively bulky end turns are used to create a sinusoidal-type flux pattern.

SUMMARY

A stator assembly for an electric motor includes an annular core centered about an axis of rotation of an inner rotor, which the stator assembly surrounds. The stator assembly has a plurality of electrical windings, each wound in a respective spiral around the outer surface of the core and arranged for current to flow in the windings. In some embodiments, the respective spirals are spaced from and parallel with one another. The stator assembly may have pole pieces that substantially enclose the core and windings. The pole pieces may be configured to taper both radially outward and axially inward to thereby concentrate flux from the core to an inner surface of the pole pieces facing the rotor.

The core may be substantially toroidal, but with a hexagonal shape at a radial cross-section. The hexagonal shape may be tapered in width toward a radially inner vertex. The pole pieces may have a thickest width at a radially inner corner to concentrate flux at a surface facing the inner rotor of the motor. In some embodiments, the pole pieces form a cylindrical surface facing the inner rotor. The stator assembly may be for various types of electric motors, including induction motors, and permanent magnet reluctance motors.

The above features and advantages and other features and advantages of the present invention are readily apparent from the following detailed description of the best modes for carrying out the invention when taken in connection with the accompanying drawings.

DETAILED DESCRIPTION

Figure 1:
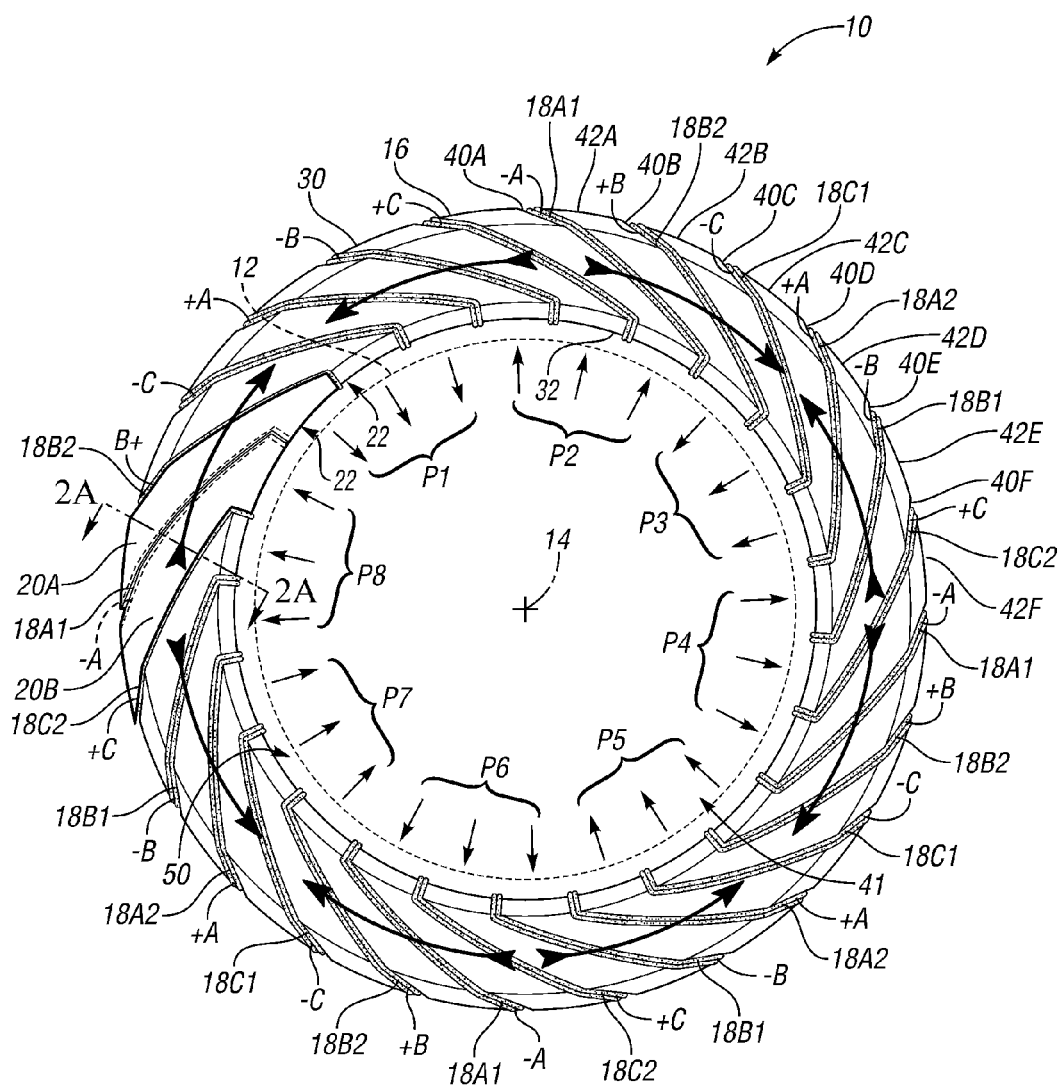
FIG. 1 is a schematic illustration in side view of a first embodiment of a stator assembly with all but two pole pieces removed to expose a stator core and electric windings.

Referring to the drawings wherein like reference numbers refer to like components, FIG. 1 is a stator assembly 10 for an electric motor. A rotor 12 of the electric motor is indicated in phantom and rotates about an axis of rotation 14. As described herein, the stator assembly 10 includes a core 16 serving as a back iron, multiple electrical windings 18A1, 18A2, 18B1, 18B2, 18C1, and 18C2, and multiple pole pieces. Only two of the pole pieces 20A, 20B are shown in order to view the core 16 and windings 18A1-18C2. The axis of rotation 14 of the rotor 12 is also a centerline of the core 16. The components of the stator assembly 10 are configured to concentrate flux at a radial inner surface 22 formed by the pole pieces 20A, 20B adjacent to the rotor 12. Furthermore, the stator assembly 10 is configured to avoid end turns of the windings 18A1-18C2. This reduces the overall axial dimensions of the stator assembly 10, an important benefit in applications where packaging space is a limiting factor, such as in hybrid vehicles.

Figure 2A:
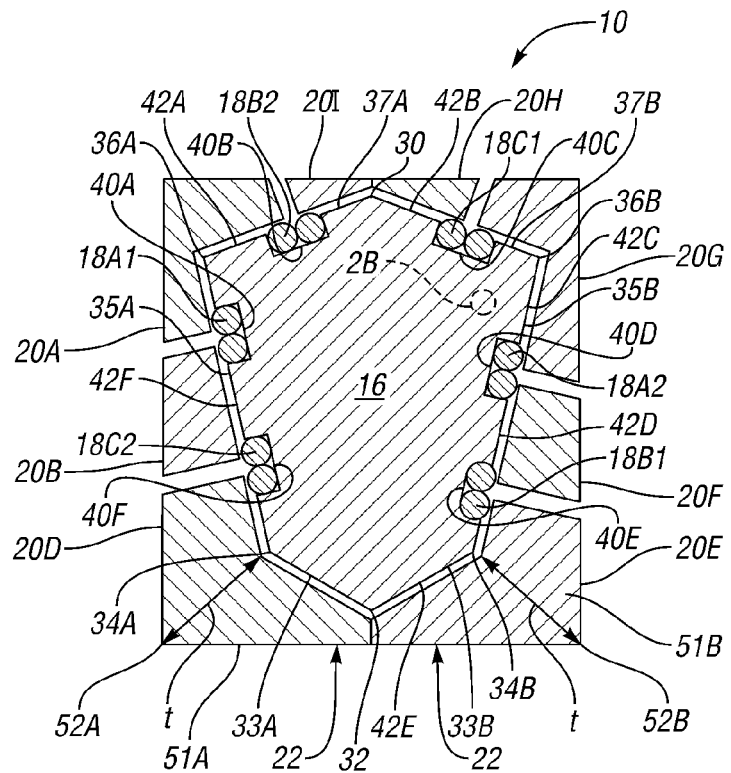
FIG. 2A is a schematic cross-sectional illustration taking at lines 2A-2A in FIG. 1.
Figure 2B:
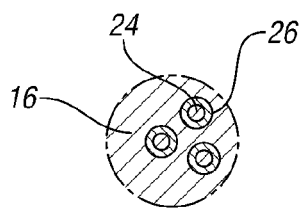
FIG. 2B is a schematic cross-sectional fragmentary illustration of a portion of the stator core of FIG. 2A.

The annular core 16 is essentially a modified toroidal core which serves as the back iron of the stator assembly 10. Referring to FIG. 2A, in the embodiment shown, the core 16 is a soft magnetic composite (SMC) material that includes iron particles 24 each coated with an insulating film 26, such as ceramic or plastic. As shown, the core 16 is a solid annular core with a tapered hexagonal shape in the radial cross-section shown in FIG. 2A. Alternatively, the core 16 may be composed of various segments assembled to form a complete annulus.

The tapered hexagonal shape in radial cross-section of the core 16 includes a first vertex 30 at a radially-outer extremity of the core 16, and a second vertex 32 and a radially-inner extremity of the core 16. The first vertex 30 forms an outer rim best shown in FIG. 1, and the second vertex 32 forms an inner rim, also best shown in FIG. 1. The core 16 also forms a first pair of additional vertices 34A, 34B and a second pair of additional vertices 36A, 36B. The vertices 34A, 34B are axially nearer one another than the vertices 36A, 36B, and are nearer to the second vertex 32 than the vertices 34A, 34B. Thus, the core 16 has a shape referred to as a tapered hexagonal shape as it tapers such that the core 16 is narrower at a radially-inner half than a radially-outer half, as is apparent in FIG. 2A. The core 16 is symmetric about a plane perpendicular to the axis 14 of FIG. 1, but tapers radially. The shape is tapered in comparison to a regular hexagonal shape in which the vertices 34A, 34B are the same distance from one another as the vertices 36A, 36B are from one another. The taper of the core 16 enables the pole pieces 20A, 20B, etc., to have a matching shape to form a rectangle in cross-section when assembled around the core 16. The matching shape of the pole pieces 20A, 20B, etc. is optimal for collecting magnetic flux along the windings 18A1, 18A2, 18B1, 18B2, 18C1 and 18C2, near the outside and ends of the stator assembly 10, transmitting that flux to the inside surface 22 of the stator assembly 10, and distributing the flux along the inside surface 22 of the stator assembly 10.

Referring to FIGS. 1 and 2A, the core 16 is formed with six slots 40A, 40B, 40C, 40D, 40E and 40F, which spiral around an outer surface of the core 16. The slots 40A-40F go through the cavity 41 formed by the annular core 16 in looping around the core 16 from the outer rim 30 to the inner rim 32 at a skewed angle such that each slot 40A, 40B, 40C, 40D, 40E and 40F, wraps around the outer surface of the core 16 four complete times. In the embodiment shown, the slots 40A, 40B, 40C, 40D, 40E and 40F are parallel with one another and equally spaced from one another. In the embodiment shown, the slots 40A, 40B, 40C, 40D, 40E, and 40F are arranged to extend parallel to axis 14 so that windings 18A1, 18A2, 18B1, 18B2, 18C1, and 18C2 are parallel to axis 14 on the radially-inward sides 33A, 33B of the core 16.

The core 16 is also formed with six spiraling ridges 42A, 42B, 42C, 42D, 42E and 42F extending radially-outward around the outer surface of the core 16. Like the slots 40A, 40B, 40C, 40D, 40E and 40F, the ridges 42A, 42B, 42C, 42D, 42E and 42F spiral around the outer surface of the core 16, going through the cavity 41 in looping around the core 16 from the outer rim 30 to the inner rim 32 at a skewed angle (but parallel to axis 14 on sides 33A, 33B) such that each ridge 42A, 42B, 42C, 42D, 42E and 42F wraps around the outer surface of the core 16 four complete times. On the radially-inward sides 33A, 33B of the core 16, the slots 40A, 40B, 40C, 40D, 40E and 40F and the ridges 42A, 42B, 42C, 42D, 42E and 42F are arranged to extend parallel to the axis 14 shown in FIG. 1. Referring to FIG. 2A, on the sides 35A, 35B, 37A and 37B of the core 16, the slots 40A, 40B, 40C, 40D, 40E and 40F and the ridges 42A, 42B, 42C, 42D, 42E and 42F are skewed to spiral around the core 16, as is shown in FIG. 1. The ridges 42A, 42B, 42C, 42D, 42E and 42F are inter-spaced with the slots 40A, 40B, 40C, 40D, 40E and 40F such that each ridge is between the windings 18A1-18C2. The ridges 42A, 42B, 42C, 42D, 42E and 42F guide the electrical windings 18A1, 18A2, 18B1, 18B2, 18C1, and 18C2 and transmit flux between them from within the core 16 to the outer surface of the core 16 (i.e. to the crests of the ridges 42A, 42B, 42C, 42D, 42E and 42F), and from the outer surface to the core 16 to within the core 16 depending on the direction of flux, as explained further below. Because the ridges and the slots extend in the axial direction along surfaces 33A, 33B (i.e., the inner radial surfaces of the core 16, the electrical windings 18A1, 18A2, 18B1, 18B2, 18C1, and 18C2 also extend parallel to the axis 14 along the surfaces 33A, 33B.

Preferably, the windings 18A1, 18A2, 18B1, 18B2, 18C1, and 18C2 carry three-phase electrical current with the phases represented as A, B, and C in FIG. 1. Current is providing to the windings 18A1, 18A2, 18B1, 18B2, 18C1, and 18C2 such that it flows in opposite directions in adjacent windings. For example the first phase of current A may flow clockwise around the core 16 as viewed in FIG. 1, and as indicated with a negative sign (−A), while the second phase of current B flowing in the winding 18B2 adjacent winding 18A1 flows counterclockwise around the core 16, as indicated with a positive sign (+B). The third phase of current C flows in winding 18C1 clockwise (as indicated by −C). The first phase of current A in winding 18A2 flows counterclockwise (as indicated by +A). The second phase of current B in winding 18B1 flows clockwise (as indicated by −B). The third phase of current C in winding 18C2 flows counterclockwise (as indicated by +C). Because current is forced to flow in opposite directions in paired windings (e.g. +A and −A), magnetic flux is pushed into the core 16 and is pushed out of the core 16 as indicated by the flux arrows superimposed along the circumference of the core 16 and radially-inward of core 16 in FIG. 1. As constructed, the three-phase alternating current forms eight poles P1, P2, P3, P4, P5, P6, P7, and P8. Those skilled in the art will recognize the current flow and flux arrows as indicating magnetic flux distribution caused by the paired windings 40A and 40D.

The exemplary stator assembly 10 has three electrical phases, and the same current flows in both 18A1 and 18A2, but in opposite spiral directions around the core 16. The current in 18A1 causes magnetic flux to try to flow around the core 16 clockwise, and the current in 18A2 causes magnetic flux to try to flow around the core 16 counterclockwise, as shown by the arrows superimposed on the core 16. So, the flux tends to flow into and out of the core 16 between windings 18A1 and 18A2, and the ridges 42A, 42B, 42C, 42D, 42E and 42F from the core 16 and pole pieces 20A, 20B, 20C, 20D, 20E, 20F, 20G, 20H and 20I gather the flux and conduct it to inner surface 22 of the core 16, so that it can flow into and out of the rotor 12 as indicated by the radial arrows. In a three-phase electric motor, current flowing through phase A is accompanied by currents in phases B and C, so the overall or net flux in the motor is more complex, but it can be approximated very closely by looking at a pair of windings at a time (18A1 and 18A2, 18B1 and 18B2, or 18C1 and 18C2) in this way and then summing the results.

Figure 3:
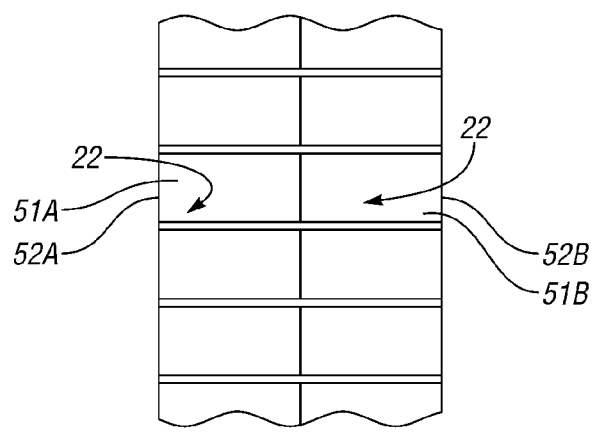
FIG. 3 is a schematic fragmentary illustration in a radially-outward view of a radially-inner surface of assembled pole pieces of the stator assembly.

As illustrated in FIGS. 1 and 2A, the windings 18A1, 18A2, 18B1, 18B2, 18C1, and 18C2 all lie along the outer surface of the core 16 along their entire lengths. Because the slots 40A, 40B, 40C, 40D, 40E and 40F and the ridges 42A, 42B, 42C, 42D, 42E and 42F extend parallel with the axis 14 along the surfaces of sides 33A, 33B of core 16, the stator tooth portions 51A, 51B of adjacent pole pieces are not skewed, as indicated in FIG. 3. In other embodiments, the windings may not be directed in an axial direction along surfaces of the core facing toward an inner rotor of the electric machine, in which case stator teeth portions of the pole pieces would be skewed at the radially-inner surface. The pole pieces 20A, 20B and the other forty-six pole pieces are configured so that the radially-inner surfaces 22 formed by the stator teeth 51A, 51B, and the forty-eight other stator teeth of the stator assembly 10 form a cylindrical surface facing the rotor 12. The windings 18A1, 18A2, 18B1, 18B2, 18C1, and 18C2 have no end turns that extend outward away from the core 16. This helps to contribute to the axial compactness of the stator assembly 10.

Referring again to FIG. 1, the two adjacent pole pieces 20A, 20B are configured to surround the portion of the half of the outer surface of the core 16 between one of the turns of windings 18B2 and 18C2 visible in FIG. 1. Each pole piece 20A, 20B spans a respective portion of the core 16 between respective loops of adjacent windings around the core 16. Pole piece 20A spans the portion of the core 16 visible in FIG. 1 between one of the four loops of windings 18A1 and 18B2, while pole piece 20B spans the portion of the core 16 visible in FIG. 1 between one of the four loops of windings 18A1 and 18C2. Thus, each of the pole pieces 20A, 20B is skewed at the same angle as windings 40A, 40B, 40C, 40D, 40E and 40F around the sides 35A and 37A of core 16. Only two pole pieces 20A, 20B are shown assembled to the core 16 in FIG. 1. In this embodiment, however, there are forty-eight total pole pieces as there are twenty-four loops of the windings 18A1, 18A2, 18B1, 18B2, 18C1, and 18C2 and therefore twenty-four portions of the core 16 between windings 18A1, 18A2, 18B1, 18B2, 18C1, and 18C2 to be covered on the sides 33A, 35A, 37A of the core 16 visible in FIG. 1, and twenty-four other portions of the core 16 between windings 18A1, 18A2, 18B1, 18B2, 18C1, and 18C2 to be covered on the sides 33B, 35B and 37B of the core 16 not visible in FIG. 1 (facing into the page in FIG. 1).

Figure 4:
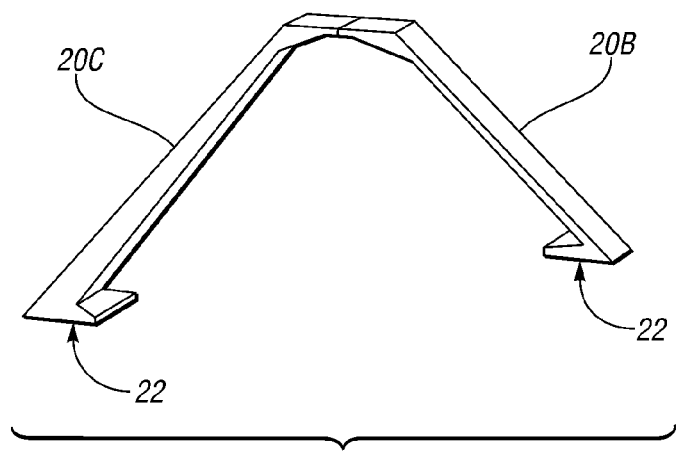
FIG. 4 is a schematic perspective view of two adjacent pole pieces of the stator assembly of FIG. 1.

Referring to FIG. 4, pole piece 20B is shown in perspective view along with a mating pole piece 20C that spirals between the same two windings as pole piece 20B on the opposite sides of the core 16 not shown in FIG. 1. Because the stator assembly 10 has six windings 18A1, 18A2, 18B1, 18B2, 18C1, and 18C2, each of which loop around the core 16 four times, there are twenty-four pole pieces on either side of the core 16 for a total of forty-eight pole pieces to substantially enclose the core 16 and windings 18A1, 18A2, 18B1, 18B2, 18C1, and 18C2. The pole pieces, represented by pole pieces 20A, 20B and 20C, allow the flux produced all the way around the core 16 to be transmitted around the perimeter of the core 16 for a radial flux-type motor. The pole pieces are configured to complement the tapered hexagonal cross-sectional shape of the core 16 by following the surfaces of the core 16, and are configured to cause the assembled stator assembly 10 to have an outer perimeter with a rectangular cross-section, as best shown in FIG. 2A. Spacing between the pole piece 20A-20I and the core 16 is exaggerated in FIG. 2A for purposes of clarity in the drawing. Pole pieces 20A and 20B as well as four other pole pieces 20D, 20E, 20F and 20G form the rectangular perimeter at the cross-section of FIG. 2A.

The pole pieces 20A, 20B, 20C (and other pole pieces not shown), collect flux from the surface of the core 16 and transmit the flux to the radially-inner surface 22 of the assembled pole pieces adjacent the air gap 50 between the stator assembly 10 and the rotor 12. In order to transmit the flux in this way and complement the tapered hexagonal shape of the core 16, the pole pieces taper in thickness from a maximum thickness t as measured from radially-inner vertices 34A, 34B, to corners 52A, 52B of stator teeth 51A, 51B, respectively. From the maximum thickness t, the pole pieces taper axially inward (i.e., along sides 33A or 33B), and taper radially-outward (i.e., along sides 35A or 35B). The axially-inward tapering portions of the pole pieces 20A, 20B, i.e., the stator teeth 51A, 51B, are configured so that the radially-inner surface 22 of the stator assembly 10 is generally cylindrical. The other pole pieces are configured identically to pole pieces 20A, 20B and 20C shown in FIGS. 1 and 4. The pole pieces may also taper in circumferential width in a direction from the inner rim (at second vertex 32) to the outer rim (at first vertex 30).

Preferably, this construction helps to limit leakage flux. Adjacent pole pieces extending between adjacent parallel windings 18A1, 18A2, 18B1, 18B2, 18C1, and 18C2 cannot touch one another as this would short circuit the flux. Accordingly, windings are partially visible on the assembled stator assembly 10 through gaps between adjacent pole pieces. The gaps between adjacent pole pieces may vary from a relatively large gap at the outer rim 30 to a small gap or no gap at the inner rim 32. If two annular pole pieces are used, as described below with respect to FIGS. 5 and 6, then the pole pieces are continuous over the windings without gaps. No short-circuiting occurs however, as magnetic particles within the annular pole pieces can be distributed to effectively create a gap (i.e., by creating an area with no magnetic particles) above the windings.

Figure 5:
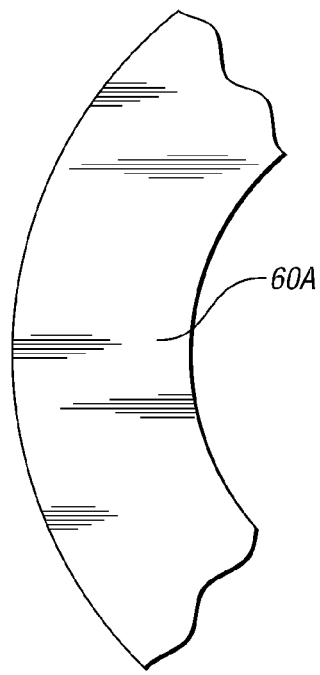
FIG. 5 is a schematic illustration in fragmentary side view of an alternative pole piece for the stator assembly of FIG. 1.
Figure 6A:
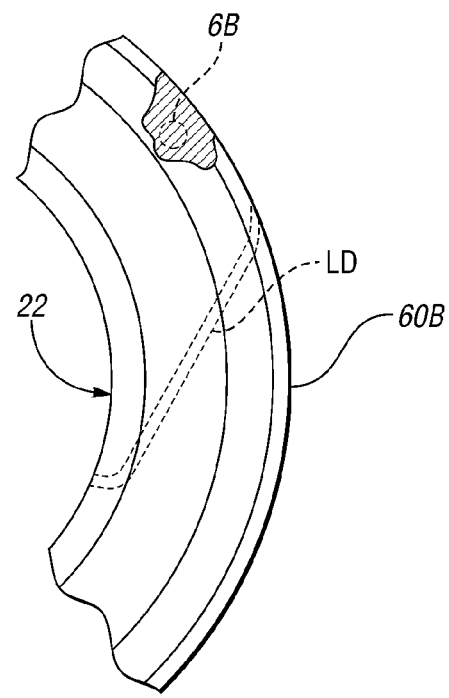
FIG. 6A is a schematic illustration in fragmentary side view of an opposite side of the pole piece of FIG. 5 and with a partially fragmented section.
Figure 6B:
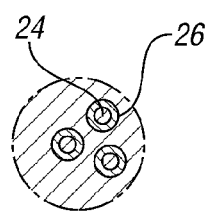
FIG. 6B is a schematic illustration of the fragmented section of FIG. 6A illustrating coated magnetic particles of the stator core.

Referring to FIGS. 5 and 6A, in an alternative embodiment, the forty-eight segmented pole pieces necessary to complete the stator assembly 10 of FIG. 1 may be replaced with two continuous annular pole pieces 60A, 60B forming two halves that are configured to enclose the core 16 and windings 18A1, 18A2, 18B1, 18B2, 18C1, and 18C2 and still provide a rectangular perimeter in radial cross-section. The pole pieces 60A and 60B may be an SMC material made of iron particles 24 coated with an insulating film 26. The coated iron particles 24 would be in lower density where the pole piece 60A or 60B is expected to be adjacent the slots 40A, 40B, 40C, 40D, 40E and 40F containing the windings 18A1, 18B2, 18C1, 18A2, 18B1 and 18C2 as indicated by one selected low density area LD, indicated with dotted lines.

In another embodiment, the stator assembly could have no pole pieces. The flux from around the outer surface of the core 16 would not be concentrated at an inner surface of the pole pieces adjacent rotor 12 in such an embodiment. Instead, only the flux directed at the inner radial sides 33A, 33B of core 16, without the aid of pole pieces, would be available for moving the rotor 12.

While the best modes for carrying out the invention have been described in detail, those familiar with the art to which this invention relates will recognize various alternative designs and embodiments for practicing the invention within the scope of the appended claims.

The invention claimed is:

1. A stator assembly for an electric motor having an inner rotor rotatable about an axis of rotation comprising:
    an annular core centered about the axis of rotation of the stator;
    a plurality of electrical windings each wound in a respective spiral around the outer surface of the core and arranged for current to flow in the windings; and
    pole pieces substantially enclosing the core and windings, wherein the pole pieces taper both radially outward and axially inward to thereby concentrate flux from the core to an inner surface of the pole pieces facing the rotor.

2. The stator assembly of claim 1, wherein the core has slots for at least partially containing the windings.

3. The stator assembly of claim 1, wherein the core has spiraled ridges between the windings and is substantially parallel with the windings.

4. The stator assembly of claim 1, wherein a radial cross-section of the core is a hexagon with a first vertex at a radially-outermost point, and with a second vertex at a radially-innermost point.

5. The stator assembly of claim 4, wherein additional vertices between the first and second vertices are positioned so that the first pair of the additional vertices is closer to the second vertex than a second pair of the additional vertices, and the additional vertices of the first pair are axially nearer one another than are the additional vertices of the second pair.

6. The stator assembly of claim 5, wherein the pole pieces form a substantially rectangular outer perimeter at a radial cross-section of the core.

7. The stator assembly of claim 6, wherein space between the pole pieces and the core increases toward the first vertex.

8. The stator assembly of claim 1, wherein the pole pieces form a substantially rectangular outer perimeter at a radial cross-section of the core.

9. The stator assembly of claim 8, wherein the pole pieces taper axially inward from radially-inner corners of the outer perimeter and taper radially outward from the radially-inner corners, flux thereby concentrated at radially-inner surfaces of the pole pieces facing the rotor.

10. The stator assembly of claim 1, wherein the plurality of electrical windings include six windings carrying three-phase alternating current forming a sinusoidal flux distribution.

11. The stator assembly of claim 1, wherein the plurality of electrical windings extend parallel to the axis of rotation along surfaces of the core nearest the axis of rotation.

12. The stator assembly of claim 1, wherein the core has spiraled ridges between the windings that are substantially parallel with the windings; and wherein each of the pole pieces extends between respective adjacent ones of the ridges and tapers in width in a radially-outward direction.

13. A stator assembly comprising:
    an annular core having a tapered hexagonal shape in radial cross-section and defining a center axis; wherein a radially-inward half of the hexagonal shape is narrower than a radially-outward half of the hexagonal shape;

electrical windings configured to carry three-phase alternating current, each winding being wound in a respective spiral around an outer surface of the annular core; wherein the windings are arranged for current to flow in opposite directions in paired ones of the windings, with the respective spirals being spaced from and parallel with one another; wherein portions of the wire on two sides of the hexagonal shape facing radially-inward extend substantially parallel with the center axis;

pole pieces substantially enclosing the core and windings and forming a generally cylindrical radially-inner surface; and wherein the pole pieces are configured to have a maximum thickness at corners of the radially-inner surface to concentrate flux from the annular core to the radially-inner surface of the pole pieces.

14. The stator assembly of claim 13, wherein the annular core has parallel spiraled slots around the outer surface of the annular core configured to partially contain the electrical windings; and wherein the annular core has parallel spiraled ridges between the slots.

15. The stator assembly of claim 13, wherein the pole pieces include a first annular pole piece extending around the circumference of the annular core and a second annular pole piece extending around the circumference of the annular core; and wherein each of the pole pieces is a soft magnetic composite material.

16. A stator assembly comprising:

an annular core defining an inner cavity;

multiple electrical windings spiraling around the annular core in loops through the inner cavity; wherein each electrical winding lays on the annular core along an entire length of the winding; and annular pole pieces substantially surrounding the annular core and electrical windings, the pole pieces having a thickest portion at respective radially-inner corners to concentrate flux at a radially-inner surface of the pole pieces.

* * * * *